United States Patent
Miloslavsky et al.

(10) Patent No.: US 11,010,101 B1
(45) Date of Patent: May 18, 2021

(54) OBJECT STORAGE SUBSYSTEMS (71) Applicant: EMC Corporation, Hopkinton, MA (US)

(72) Inventors: Philip Miloslavsky, Ashland, MA (US); Matthew David Ivester, Cambridge, MA (US); David Shadmon, Newton, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 603 days.

(21) Appl. No.: 14/491,151

(22) Filed: Sep. 19, 2014

(51) Int. Cl.
G06F 3/06 (2006.01)
(52) U.S. Cl.
CPC .......... G06F 3/0665 (2013.01); G06F 3/0619 (2013.01); G06F 3/0679 (2013.01); G06F 3/0689 (2013.01); G06F 2206/1014 (2013.01); G06F 2212/7207 (2013.01)
(58) Field of Classification Search
None
See application file for complete search history.

(56) References Cited

U.S. PATENT DOCUMENTS

| 5,761,680 | A * | 6/1998 | Cohen | G06F 3/0607 |
| 8,285,967 | B1 * | 10/2012 | Veeraswamy | G06F 17/30091 |
| | | | | 707/821 |
| 2005/0131958 | A1 * | 6/2005 | Rhodes | G06F 11/1464 |
| 2008/0172563 | A1 * | 7/2008 | Stokes | G06F 21/80 |
| | | | | 713/193 |
| 2008/0294844 | A1 * | 11/2008 | Yamasaki | G06F 3/061 |
| | | | | 711/114 |
| 2009/0007126 | A1 * | 1/2009 | Jelinek | G06F 9/5016 |
| | | | | 718/104 |
| 2010/0023565 | A1 * | 1/2010 | Colbert | G06F 9/4856 |
| | | | | 711/E12.001 |
| 2010/0125583 | A1 * | 5/2010 | Casper | G06F 17/30067 |
| | | | | 707/745 |
| 2010/0153617 | A1 * | 6/2010 | Miroshnichenko | G06F 3/061 |
| | | | | 711/6 |
| 2010/0211620 | A1 * | 8/2010 | Matsuzawa | G06F 12/0223 |
| | | | | 707/822 |
| 2011/0153976 | A1 * | 6/2011 | Tamura | G06F 3/0608 |
| | | | | 711/170 |
| 2012/0089764 | A1 * | 4/2012 | Baskakov | G06F 12/10 |
| | | | | 711/6 |
| 2013/0013856 | A1 * | 1/2013 | Rogers | G06F 12/0292 |
| | | | | 711/103 |
| 2014/0324782 | A1 * | 10/2014 | Graefe | G06F 11/1451 |
| | | | | 707/646 |
| 2015/0213049 | A1 * | 7/2015 | Kleiman | G06F 17/30159 |
| | | | | 707/692 |

* cited by examiner

Primary Examiner — Charles J Choi
(74) Attorney, Agent, or Firm — Anderson Gorecki LLP (57) ABSTRACT A storage array uses paged metadata. Each storage director has access to a plurality of object storage subsystems in a global memory. The object storage subsystems describe locations of paged metadata in backing storage. Each object storage subsystem includes a unique identifier, a pointer to a descriptive data structure that indicates availability of free space for paged metadata for that object storage subsystem, and different types of inodes which describe objects in backing storage. The object storage subsystems are used to locate metadata for loading into global memory, and creation and deletion of objects.

20 Claims, 9 Drawing Sheets

Object Delete

OBJECT STORAGE SUBSYSTEMS

CROSS-REFERENCE TO RELATED APPLICATIONS

NA

BACKGROUND

Aspects of this disclosure are generally related to enterprise data storage systems. Examples of enterprise data storage systems include the Symmetrix family of storage array products of EMC Corporation. Enterprise data storage systems are used to maintain relatively large data sets and support a relatively large number of concurrent users. The data storage system typically includes multiple physical storage devices. The physical storage devices may be organized by technology type and arranged in hierarchical tiers based on performance. Users, e.g., applications and devices, can use the resources of the storage array by communicating with a host device. For example, the host device may be a server associated with an application such as a database for which data is maintained by the storage system, and the user may be a device which prompts database activity. The storage system provides storage virtualization by presenting logical storage devices to the host while maintaining the associated data in the physical storage devices.

SUMMARY

In accordance with an aspect, an apparatus comprises: a plurality of storage director devices which utilize one or more physical storage devices to present a logical storage device to at least one host device, each storage director device having access to a plurality of object storage subsystems in a global memory which is accessible to all storage director devices, the object storage subsystems describing locations of paged metadata in at least one backing storage device, each object storage subsystem being associated with a descriptive data structure that indicates availability of free space for paged metadata for that object storage subsystem in the at least one backing storage device. In some implementations the global memory comprises at least one volatile storage device on each director. In some implementations the at least one backing storage device comprises at least one non-volatile storage device on each director device. In some implementations each object storage subsystem describes a fixed-size portion of the at least one backing storage device. In some implementations each fixed-size portion is mirrored at least once. In some implementations each object storage subsystem comprises a unique object storage subsystem identification number, the respective descriptive data structure associated with that object storage subsystem, and one or more sets of inodes (indexing nodes). In some implementations the descriptive data structure includes a plurality of levels, and wherein a top level includes a single cell which describes free space in the fixed-size portion of the backing storage associated with the respective object storage subsystem. In some implementations the descriptive data structure includes a bottom level with multiple cells, each bottom level cell comprising a bitmap of page availability in a fixed-size sub-portion of the fixed-size portion of backing storage associated with the respective object storage subsystem. In some implementations the descriptive data structure includes a plurality of intermediate levels with multiple cells, each intermediate level cell describing free space in child cells at a next lower level. In some implementations each intermediate level cell comprises a bitmap of the child cells at the next lower level, the bitmap indicating which of the child cells have page availability at the bottom level with hints to partially full fixed-size sub-portions of the fixed-size portion of backing storage and hints to empty fixed-size sub-portions of the fixed-size portion of backing storage. In some implementations the top level cell and intermediate level cells include a first counter which indicates a count of free single pages and a second counter which indicates a count of free multi-pages, where each multi-page is sequential and has a predetermined size. In some implementations the predetermined size is $2^y$ pages, where y is greater than 0. In some implementations the top level cell and intermediate level cells further include a third counter which indicates a number of partially full fixed-size sub-portions of the fixed-size portion of backing storage, and a fourth counter which indicates a number of empty fixed-size sub-portions of the fixed-size portion of backing storage. In some implementations the object storage subsystem number corresponds to a plurality of mirrors of the fixed-size portion of the backing storage associated with the respective object storage subsystem. In some implementations each set of inodes comprise a predictable arrangement of one or more equal size or predictable size nodes including a Start inode disposed at a beginning of any inode set and having pointers to single pages, at least one Compact inode which always references $2^y$ pages with a pointer, where y is greater than 0, and at least one End inode which references single pages with single pointers. In some implementations the inodes of the set are stored in sequential locations in global memory. In some implementations the Start inode contains up to $2^x$ pointers to single pages in the at least one backing storage device, where $2^y$ is a multiple of $2^x$. In some implementations each Compact inode contains at least one pointer to $2^y$ pages in the at least one backing storage device. In some implementations each End inode contains up to $2^x$ pointers to single pages in the at least one backing storage device, where $2^y$ is a multiple of $2^x$. In some implementations each director device further comprises a first searchable data structure which indicates locations of metatdata in global memory. In some implementations each director device further comprises a second searchable data structure which indicates locations of the object storage subsystems in global memory.

In accordance with another aspect a method comprises: receiving an I/O request at a storage system which comprises a plurality of storage director devices which utilize one or more physical storage devices to present a logical storage device to at least one host device, each storage director device having access to a plurality of object storage subsystems in a global memory which is accessible to all storage director devices, the object storage subsystems describing locations of paged metadata in at least one backing storage device; at one of the director devices, in response to the I/O request, determining that metadata associated with data associated with the I/O request is not in global memory, and identifying at least one of the plurality of object storage subsystems which is associated with the data; using the at least one identified object storage subsystem to locate the metadata in the at least one backing storage device; copying the metadata from the at least one backing storage device to global memory; and utilizing the metadata in global memory to locate the data. In some implementations the object storage subsystems and metadata locations in global memory are identified based on one or more of device number, cylinder number, head (track) and size as determined from the I/O request.

In accordance with another aspect a method comprises: in storage system comprising a plurality of storage director devices which utilize one or more physical storage devices to present a logical storage device to at least one host device, each storage director device having access to a plurality of object storage subsystems in a global memory which is accessible to all storage director devices, the object storage subsystems describing locations of paged metadata in at least one backing storage device, each object storage subsystem being associated with a descriptive data structure that indicates availability of free space for paged metadata for that object storage subsystem in the at least one backing storage device, creating an object by: selecting at least one of the object storage subsystems from the plurality of object storage subsystems; allocating pages to inodes which include pointers to the at least one backing storage device; and updating the descriptive data structure. In some implementations the method further includes updating a searchable data structure to indicate location of the selected object storage subsystem in global memory.

In accordance with another aspect a method comprises: in a storage system comprising a plurality of storage director devices which utilize one or more physical storage devices to present a logical storage device to at least one host device, each storage director device having access to a plurality of object storage subsystems in a global memory which is accessible to all storage director devices, the object storage subsystems including inodes describing locations of paged metadata in at least one backing storage device, each object storage subsystem being associated with a descriptive data structure that indicates availability of free space for paged metadata for that object storage subsystem in the at least one backing storage device, deleting an object by: determining on which of the plurality of object storage subsystems the inodes associated with the object are located; using pointers in the inodes associated with the object to identify corresponding bits in a storage level bitmap associated with the descriptive data structure; and clearing the identified bits. In some implementations the method further includes updating the descriptive data structure to indicate that the object has been deleted.

In accordance with another aspect a method comprises: in a storage system comprising a plurality of storage director devices which utilize one or more physical storage devices to present a logical storage device to at least one host device, each storage director device having access to a plurality of object storage subsystems in a global memory which is accessible to all storage director devices, the object storage subsystems including inodes describing locations of paged metadata in at least one backing storage device, each object storage subsystem being associated with a descriptive data structure that indicates availability of free space for paged metadata for that object storage subsystem in the at least one backing storage device, the descriptive data structure including a single top level cell and a plurality of intermediate level cells and bottom level cells arranged in a hierarchical tree, allocating pages in the at least one backing storage device by: determining how many pages are needed in terms of single pages and sets of a predetermined number of contiguous multi-pages; beginning at a top level of the descriptive data structure, following hints which lead to cells at intermediate levels until reaching a first bottom level cell, the hints indicating regions of a fixed-size slice of the at least one backing storage device where free pages exist in partial full regions and empty regions; and at the first bottom level cell, inverting bitmap entries corresponding to free resources in a region of the bitmap associated with the first bottom level cell. In some implementations the method further comprises selecting an intermediate level cell which is a parent of the bottom level cell and following a next sequential hint to a second bottom level cell.

In accordance with another aspect a method comprises: in storage system comprising a plurality of storage director devices which utilize one or more physical storage devices to present a logical storage device to at least one host device, each storage director device having access to a plurality of object storage subsystems in a global memory which is accessible to all storage director devices, the object storage subsystems including inodes describing locations of paged metadata in at least one backing storage device, each object storage subsystem being associated with a descriptive data structure that indicates availability of free space for paged metadata for that object storage subsystem in the at least one backing storage device, the descriptive data structure including a single top level cell and a plurality of intermediate level cells and bottom level cells arranged in a hierarchical tree in which each cell above the bottom level has child cells and each cell below the top level has one respective parent cell, updating counters associated with the cells by: for each counter at each parent cell, determining a counter delta for each child cell; summing the counter deltas of the child cells; and updating the parent cell counter with the summed counter deltas of the child cells.

DETAILED DESCRIPTION

For the purposes of this description a block of storage is 512 bytes, a track is 64 KB, and a cylinder includes 15 tracks. However the concepts described herein are not limited to such conventions. Furthermore, all examples and features mentioned below can be combined in any technically possible way.

Figure 1:
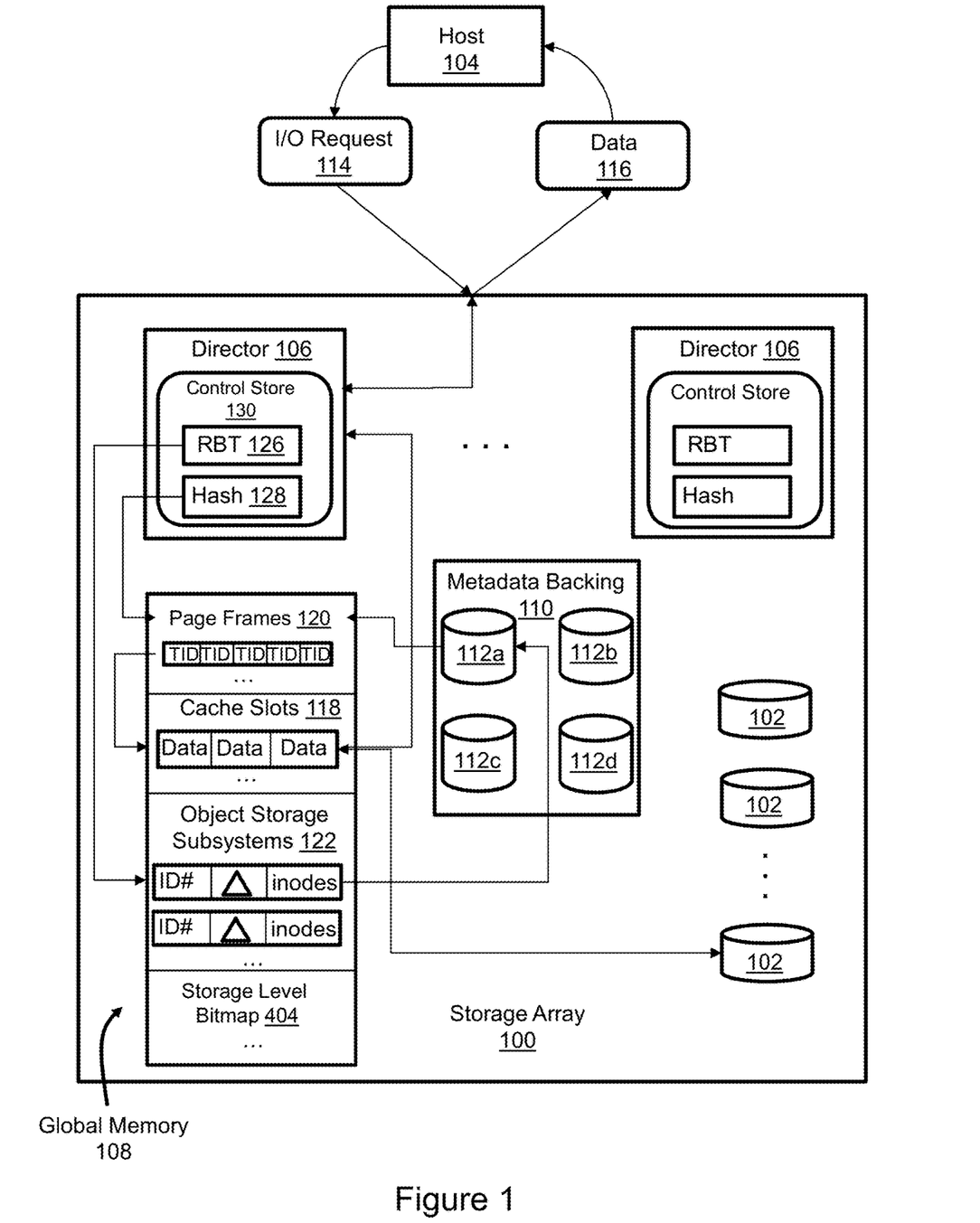
FIG. 1 illustrates a storage array suitable for operation in a network "cloud" environment.

FIG. 1 illustrates a storage system in a network "cloud" environment. A storage array 100 maintains data on physical storage devices 102 and supports a large number of concurrent users. Examples of physical storage devices 102 that may be used in the storage array include but are not limited to SSDs (solid state drives, e.g., flash) and HDDs (hard disk drives, e.g., with spinning magnetic media). Computing devices such as user terminals and servers use the data maintained in the storage devices 102 by communicating with the data storage array 100 via a host device 104. Elements of the storage array 100 include a plurality of directors 106, a global memory 108 and metadata backing storage 110. Each director 106 may be a separate hardware subsystem. The directors may operate in parallel such that I/O requests are concurrently serviced and the failure of one director does not cause the failure of other directors. The global memory 108, which is illustrated as a single logical memory resource, could be implemented in multiple physical memory devices, e.g., multiple RAM (random access memory) components, which may be distributed across multiple physical devices, e.g., on the directors 106. The metadata backing storage 110, which is illustrated as a set of four logical storage devices 112a, 112b, 112c, 112d, could also be distributed across the directors 106, e.g., up to four separate SSDs on each director.

The directors 106 service I/Os and provide storage virtualization for the host 104. From the perspective of the host, the data is stored on one or more logical storage devices which are presented by the directors. The directors use the physical storage devices 102 to maintain the data associated with the presented logical devices. Each director 106 includes an interface for communicating with the host 104, e.g., for sending, receiving, or sending and receiving an I/O request 114 and data 116 associated with I/Os. It should also be understood that the directors 106 utilize metadata that is paged to save space. A cache slot section 118 of global memory 108 is used to temporarily store selected data such that it can be accessed by a director 106 directly from the global memory rather than the storage devices 102. The global memory 108, e.g. RAM, has better data access performance characteristics than the storage devices 102, e.g. SSDs/HDDs, although these specific technologies should not be viewed as limiting. Data initially read from the storage devices 102 in response to a hint or an I/O request 114 by the host 104 is copied to cache slots 118 in the global memory. The cache slots have a fixed size, e.g., 64 KB. When data is requested that is in the cache slots then that cached copy is used to service the I/O request. When data is requested that is not in the cache slots then that data is copied from the storage devices 102 into the cache slots 118. Generally, data that has not been accessed recently or within a predetermined period of time may be flushed from global memory 108 and written to the storage devices 102. Again, however, data paging is not directly related to the present disclosure.

Metadata maintained by the storage array indicates, among a variety of things, where data is located. Consequently, metadata is utilized for servicing I/Os and to facilitate data paging. The metadata may include TIDs (track ID tables) in global memory 108 which include pointers to the data in the cache slots 118. The TIDs are maintained in fixed-size page frames 120, e.g., 4 KB, where each page frame holds multiple TIDs. The inventors have recognized that the trend of increased storage capacity of storage systems has led to an increase in the amount of metadata to be maintained. Furthermore, maintaining all of the metadata for the storage system in costly high performance volatile memory increases the overall cost of the storage system. In accordance with one aspect the illustrated storage array implements metadata paging utilizing less costly metadata backing storage 110 such as SSDs. Consequently, only a subset of metadata needs to be present in global memory 108 at any given point in time, and therefore less RAM is required. This may be advantageous because SSD storage has a lower cost per bit than RAM. However the concepts are not limited to these specific storage technologies and are generally applicable to any storage technologies for which there is a cost per bit differential. Aspects of metadata paging are described in greater detail below.

Figure 2:
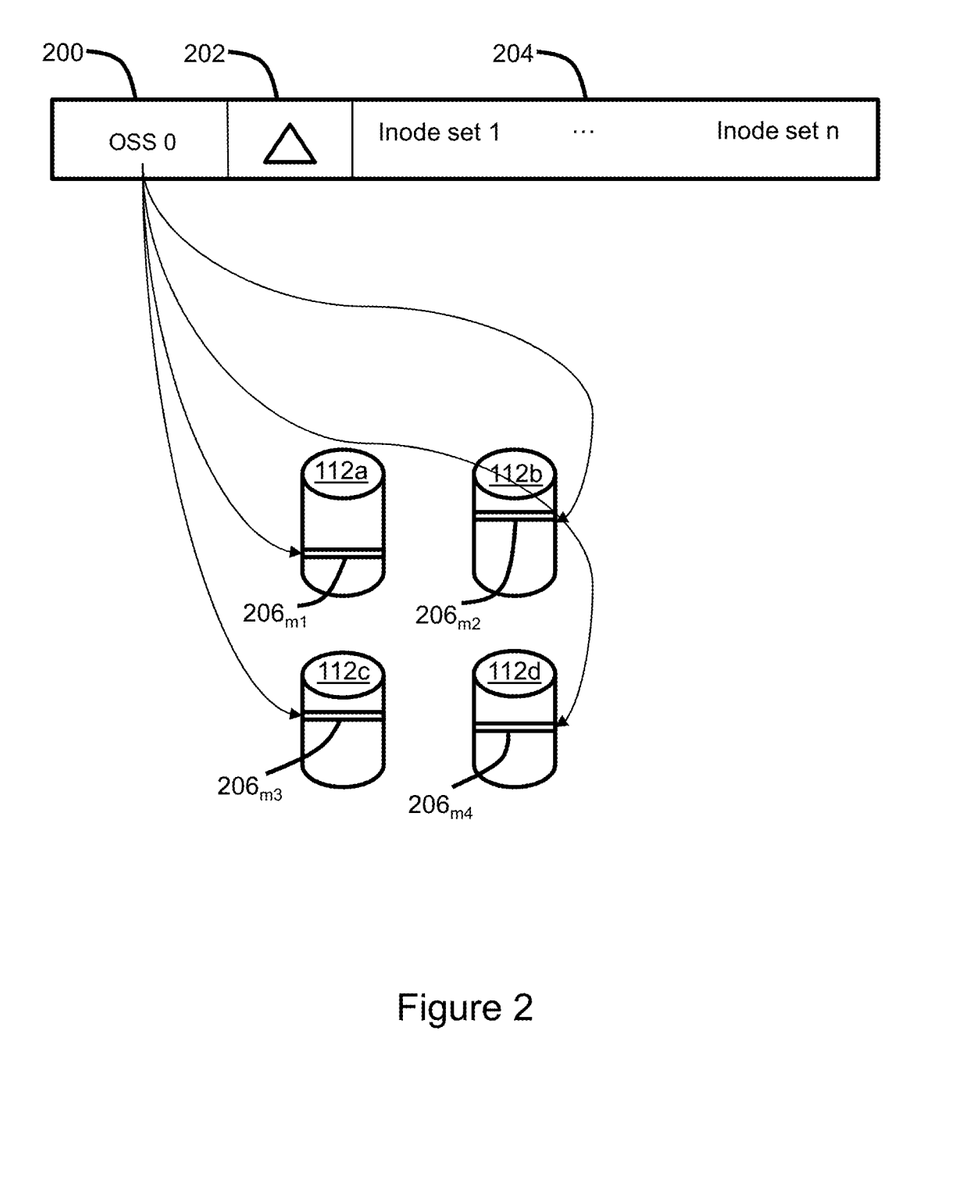
FIG. 2 illustrates a System Maintained Object Storage Subsystem.

Referring now to FIGS. 1 and 2, one aspect of metadata paging in a storage array which supports many concurrent users is use of multiple devices represented on multiple OSSs (System Maintained Object Storage Subsystems). The multiple OSSs are maintained in a section 122 of the global memory 108. Each OSS, e.g., OSS 0 (FIG. 2), includes a unique OSS identification number 200, a hierarchical data structure 202 ("pyramid"), and one or more sets 204 of inodes (predictable size object location and state nodes). Each OSS is uniquely associated with a corresponding metadata backing slice (hereafter "Slice") in metadata backing storage 110, e.g., OSS 0 (FIG. 2) is associated with Slice 206. The Slices may have a fixed-size, e.g. 20 GB. The Slices may also be mirrored, e.g., three or four mirrors which are shown in FIG. 2 as mirrors $206_{m1}$, $206_{m2}$, $206_{m3}$ and $206_{m4}$. Mirrors may be located on the same storage device, e.g., device 112a, different storage devices, e.g., 112a and 112b, and also possibly on different directors. The mirrored Slices need not be at the same location in each storage device in which they are stored. Within the mirrors $206_{m1}$, $206_{m2}$, $206_{m3}$ and $206_{m4}$ the TIDs are maintained in a "compressed" form which differs from the uncompressed form of TIDs in global memory 108. More particularly, there may be data compression and additional information such as state may be included when the TID is uncompressed in global memory.

Figure 3:
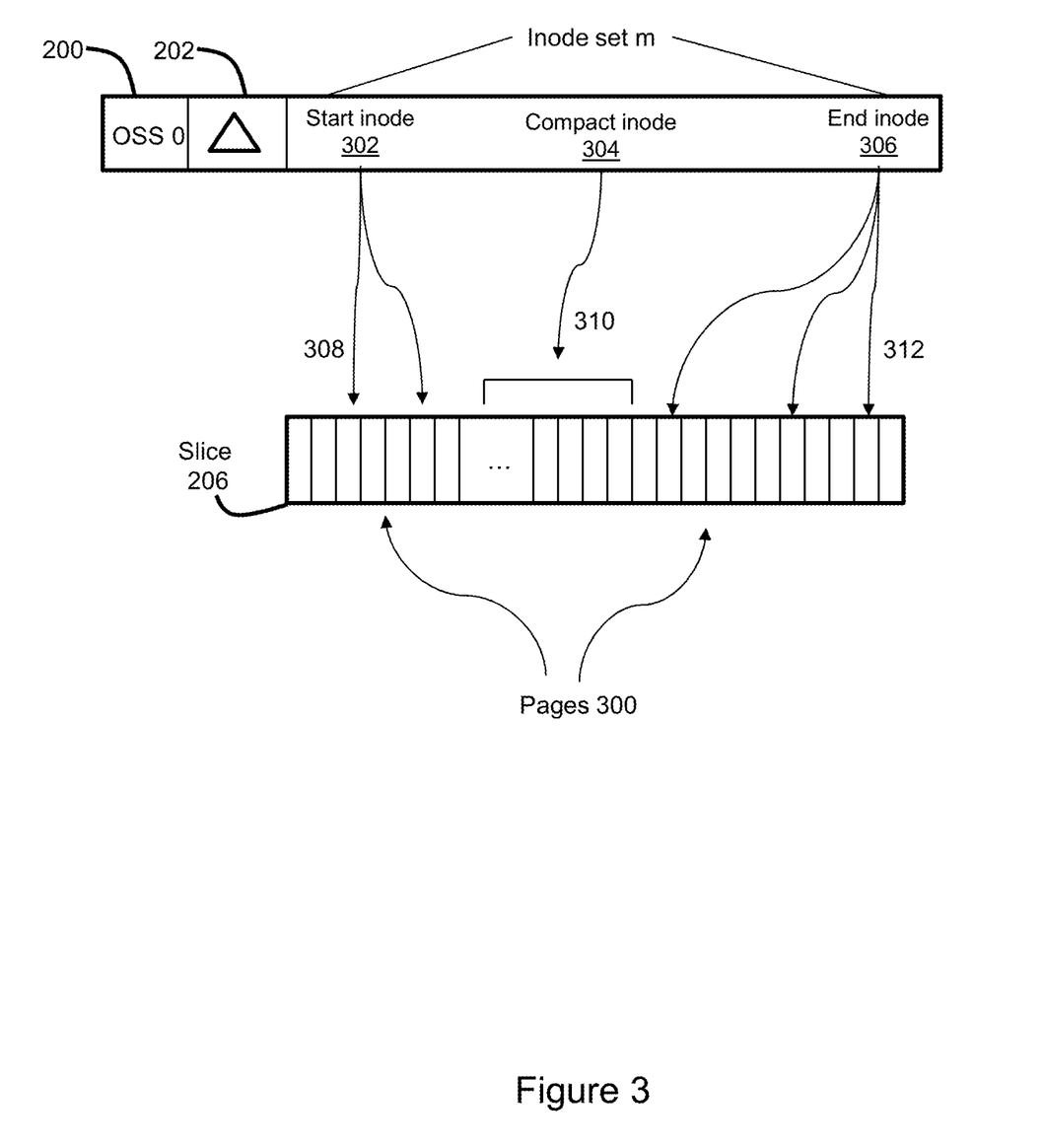
FIG. 3 illustrates the relationship between an inode set and paged metadata.

Referring now to FIGS. 1 and 3, the inode sets of exemplary OSS 0 indicate the locations of TIDs associated with that OSS within the mirrors corresponding to the OSS identification number 200. For example, inode set m of OSS 0 indicates locations of TIDs in Slice 206 (and thus mirrors $206_{m1}$, $206_{m2}$, $206_{m3}$ and $206_{m4}$, FIG. 2). Each inode set includes one or more types of inodes of various types which include pointers to fixed-size pages 300, e.g., pointers to the 4 KB pages of the 20 GB Slice. The inode types in the illustrated example include a Start inode 302, a Compact inode 304, and an End inode. The Start inode 302 indicates the start of an inode set, e.g., inode set m. The Compact inode 304 efficiently references a relatively large number of pages 300. The End inode 306 efficiently references a relatively small number of pages 300. The inode set is stored in sequential locations in global memory. Further, each pointer in an inode references a sequentially addressed area of the Slice 206. However, the pages referenced by the different pointers and inodes of the set need not be sequential within the Slice. Aspects of the different types of inodes are described in greater detail below.

An inode set includes only one Start inode 302. The Start inode indicates the start of an inode set and can be located via a descriptive data structure such as a RBT (red black tree) 126 (FIG. 1), although a wide variety of data structures could be used. Because an inode set is stored in sequential locations in global memory, the complete inode set may be located by finding the Start inode of the set. Further, it may be possible to obtain an index based on the TID sequence number in a constant (as the term is understood in O(n) terminology) amount of time to any inode of the object. The Start inode contains pointers to up to a predetermined number of pages 300, e.g., pointers to up to 32 of the 4 KB pages in the 20 GB Slice 206. Two pointers 308 are shown in FIG. 3. The number of pages being referenced, e.g., 1-32, is indicated in a field in the Start inode.

The inode set includes any number of Compact inodes 304, including possibly zero Compact inodes. Each Compact inode includes at least one pointer 310 to a relatively large number of pages in the Slice, e.g., a single pointer to 128 of the 4 KB pages. The number of multi-page pointers in a Compact inode is an implementation choice. Compact inodes facilitate time-efficient allocation and de-allocation.

The inode set includes any number of End inodes 306, including possibly zero End inodes, but not a number that would reference a number of pages which would exceed the number of pages referenced by a Compact inode. The End inode 306 contains pointers to up to a predetermined number of pages, e.g., pointers to up to 32 of the 4 KB pages in the 20 GB Slice. Three pointers 312 are shown in FIG. 3. The number of pages being referenced is indicated in a field in the End inode. If a Compact inode references 128 pages and an End inode references up to 32 pages then the inode set would have no more than four End inodes because four End inodes would reference up to 128 pages. End inodes facilitate space-efficient allocation and de-allocation.

The illustrated inode set (inode set m in FIG. 3) with one inode of each type could reference up to 192 pages (32+128+32). If 1000 pages were required for a device then the inode set would include one Start inode, seven Compact inodes, and three End inodes (with pointers to 32, 32 and 8 pages respectively). However, the exemplary numbers of pages referenced by each type of inode should not be viewed as limiting and other powers of two could be implemented.

Figure 4:
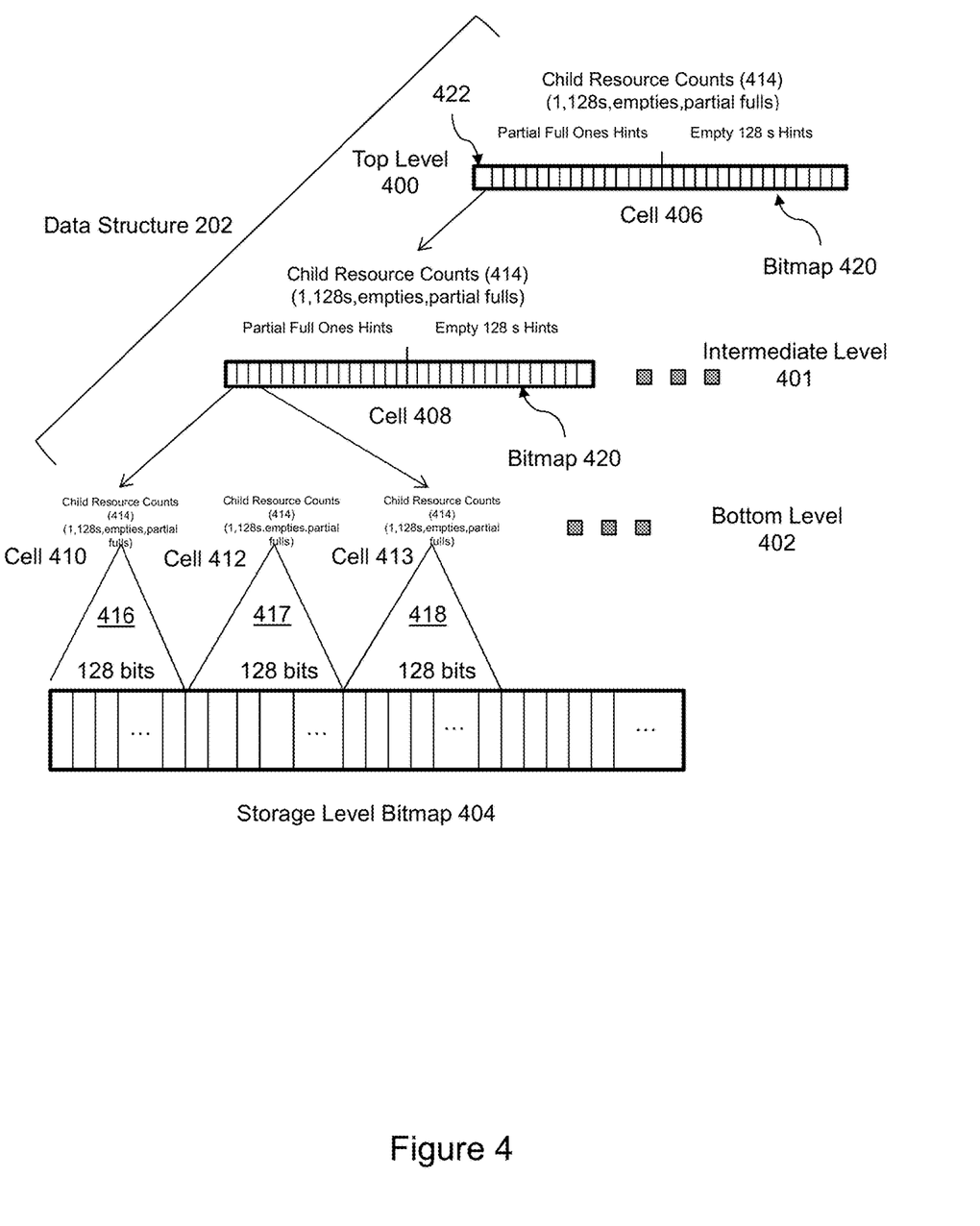
FIG. 4 illustrates a pyramid data structure which describes a storage level bitmap of paged metadata.

Referring now to FIGS. 1, 2 and 4, the pyramid data structure 202 corresponding to an OSS includes a storage level bitmap 404 corresponding to the Slice associated with that OSS. In other words, each bitmap 404 represents the fixed-size, e.g., 20 GB, Slice 206 associated with the OSS ID 200, e.g., a 32 Kb bitmap. The data structure 202 includes multiple cells organized in multiple levels, e.g., cell 406 at the top level 400, cell 408 at an intermediate level 401, and cells 410, 412 and 413 at the bottom level 402. At the bottom level 402 each cell describes a respective fixed-size, e.g., 128 bit, region of the bitmap 404. For example, cell 408 describes region 416, and cell 413 describes region 418. The cells at every level include counters 414 which indicate child resource counts of all related child cells at levels below that cell, i.e., the sum the child counters within a family. The bitmap 404 is organized as 128 bit regions 416, 417, 418, etc., where each bit corresponds to a page in the Slice. The counters indicate the number of bits clear in partially full 128 bit regions, the number of 128 bit regions that are clear, the number of 128 bit regions that are full, and the number of 128 bit regions that are partially full. The cells at all levels other than the bottom level 402 also include hints to indicate the partial full is (single free pages in a region with at least one page taken) and empty 128s (a region in which all 128 pages are free) are located. The hints are a bitmap 420 of the child cells at the next lower level. For example, if the leftmost location 422 in the bitmap of cell 406 corresponds to the leftmost child cell 408 at the next lower level then the partial full is hint would indicate whether that child cell had single free pages. Similarly, the empty 128s hint would indicate whether the child cell 408 had 128 sequential free pages. The fanout of the pyramid data structure 202 is an implementation choice, but the illustrated example includes 16 child cells for each parent cell. The cells at the bottom level 402 of the pyramid data structure include only counters corresponding to the respective 128 bit regions of the bitmap which the cells describe. It should be noted that although only three levels are illustrated, many more levels may be implemented in practice. As will be explained in greater detail below, the pyramid data structure facilitates timely evaluation of available free pages in the Slice and also helps to locate and allocate those pages.

Having described the architecture of the storage system, various procedures which may be implemented in that architecture will now be described. The procedural steps need not necessarily be performed in the order in which they are shown in the illustrated examples.

Figure 5:
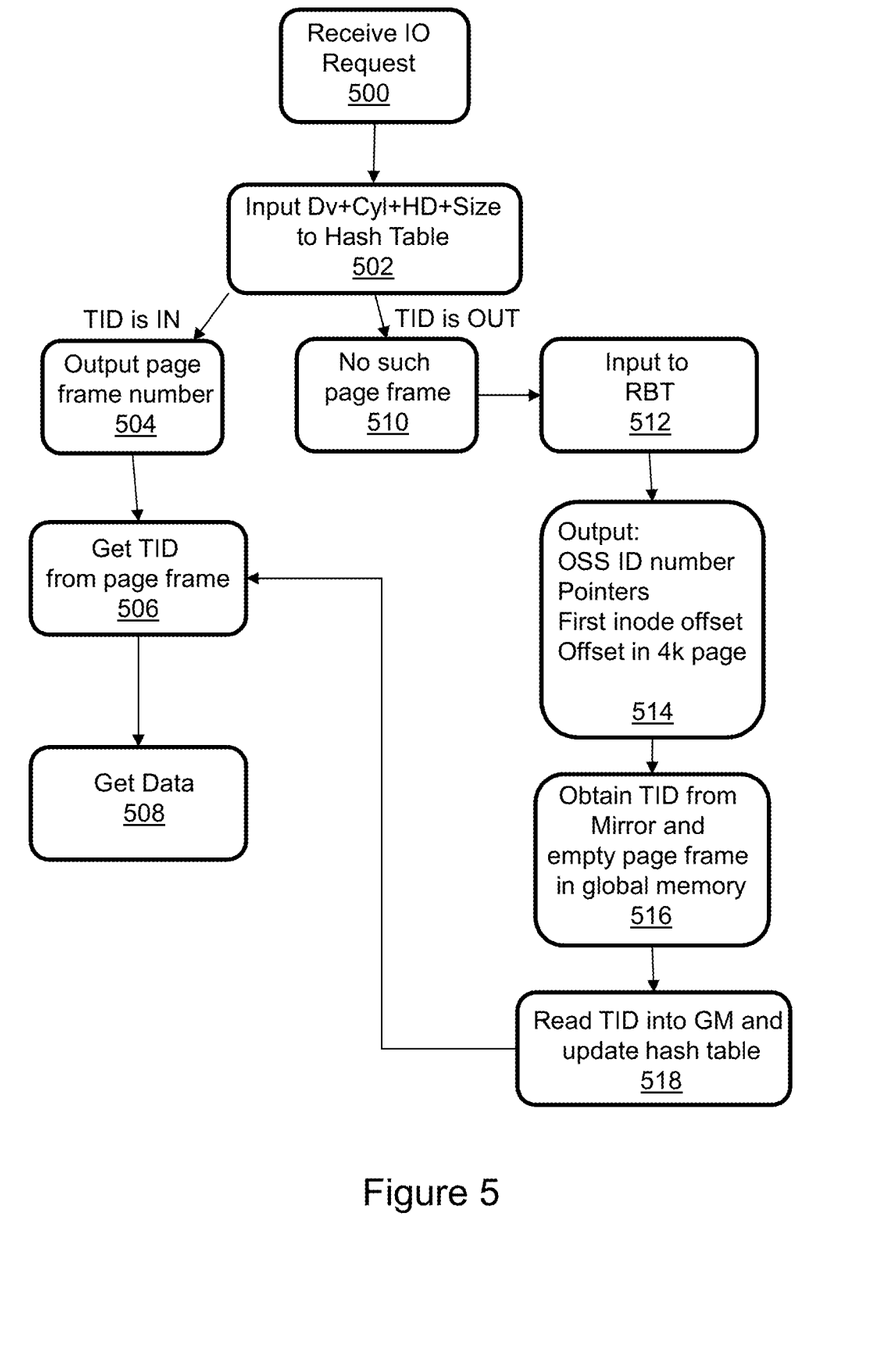
FIG. 5 illustrates a procedure for servicing an I/O.

Referring now to FIGS. 1 and 5, the procedure for finding and utilizing a TID to satisfy an IO request 114 varies depending on whether the TID is present in global memory 108. A director 106 determines various information from an IO request 114 received in step 500. In order to determine corresponding TIDs the director inputs the device number, cylinder number, head (track) and size to a hash table 128 maintained in a control store 130 of the director as indicated in step 502. It will be appreciated that a wide variety of descriptive data structures could be used, of which a hash table is simply one example. The hash table 128 indicates the locations of TIDs in pages frames 120 in global memory 108. If there is an entry in the hash table corresponding to the inputted information then the TID is IN global memory. In that case, i.e., a cache hit, the hash table outputs a corresponding page frame number as indicated in step 504. The page frame number outputted by the hash table is used to locate the page frame holding the TID in global memory. The TID is obtained from global memory as indicated in step 506 and used to find the cache slot associated with the IO, thereby finding the user data in global memory as indicated in step 508. In the case of a Read IO the data could then be returned in response to the IO request.

If there is not an entry in the hash table 128 corresponding to the inputted information then the TID is OUT of global memory. In that case, i.e., a cache miss, the hash table outputs an indicator that there is no such page frame referenced in the hash table as indicated in step 510. The director then inputs the information (device number etc.) to the RBT 126 (red black tree) maintained in the control store as indicated in step 512. The RBT outputs a OSS ID number, pointers to Slice mirrors, offset of the first inode, and offset in the 4k page as indicated in step 514. The TID is then obtained from one of the identified mirrors using the outputted information and an available page frame is obtained in global memory as indicated in step 516. The TID is then copied into the obtained page frame and the hash table is updated to indicate that the TID is now IN as indicated in step 518. The TIDs are not necessarily stored in an order which corresponds to the order in which the data is located in the device itself. Rather, any page frame may hold any TID. The TID in global memory is used to obtain the data as already described above.

Figure 6:
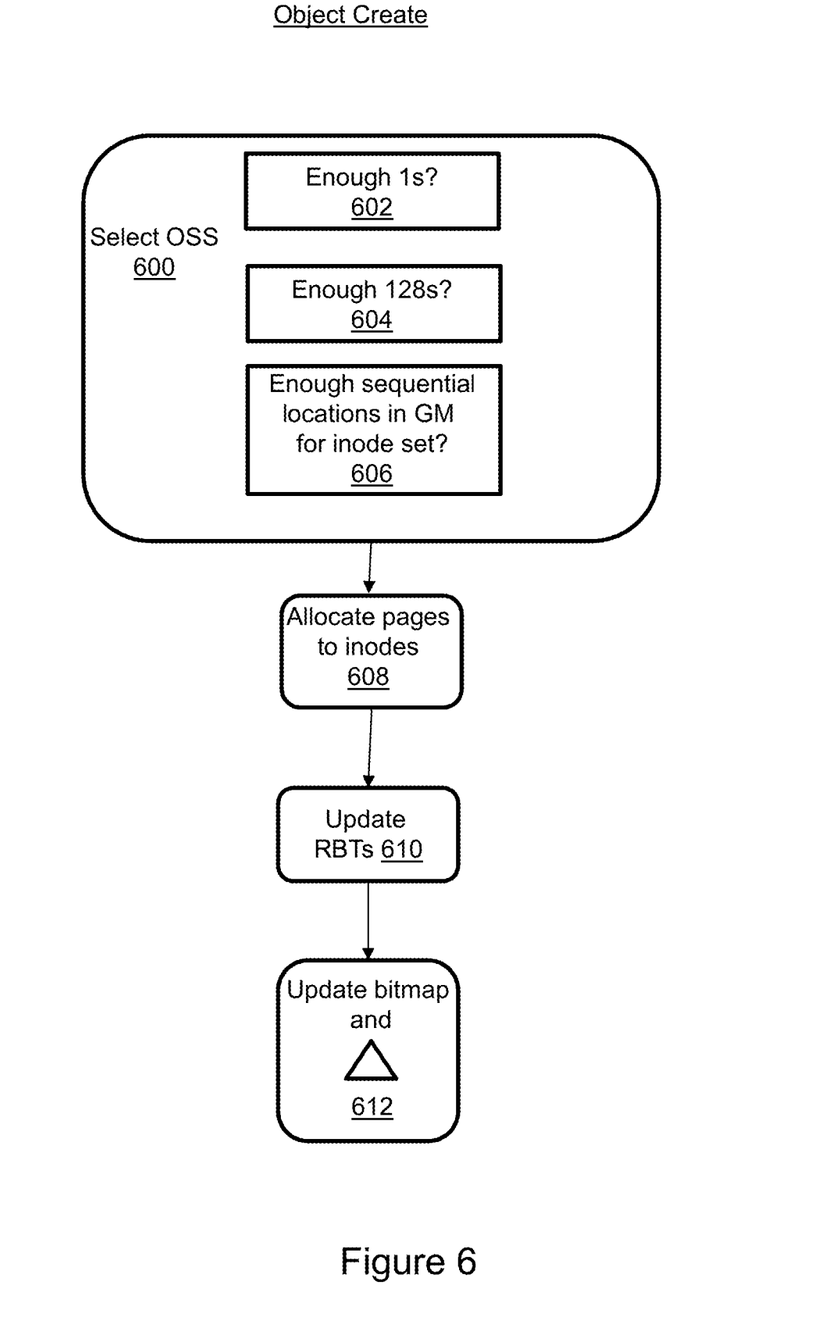
FIG. 6 illustrates an object create procedure.

FIG. 6 illustrates an object create procedure. The procedure could be used in a variety of situations including but not limited to device creation. The first step 600 is to select a suitable OSS. Selecting a suitable OSS can include checking for a sufficient number of empty is (step 602) and empty 128s (step 604) in the associated Slice in the metadata backing storage devices. This information can be determined from the counts at the top levels of the pyramid data structures associated with the OSSs. Selecting a OSS can also include checking for sufficient sequential free space in global memory to host the inode set as indicated in step 606. Once a suitable OSS has been selected, pages are allocated to the inodes as indicated in step 608. The RBT, which is a shared data structure with local copies on each director, is then updated in step 610 to indicate where the paged metadata will be located. The bitmap (404, FIG. 4) and pyramid data structure (202, FIG. 4) are updated in step 612 to indicate changes associated with the allocation.

Figure 7:
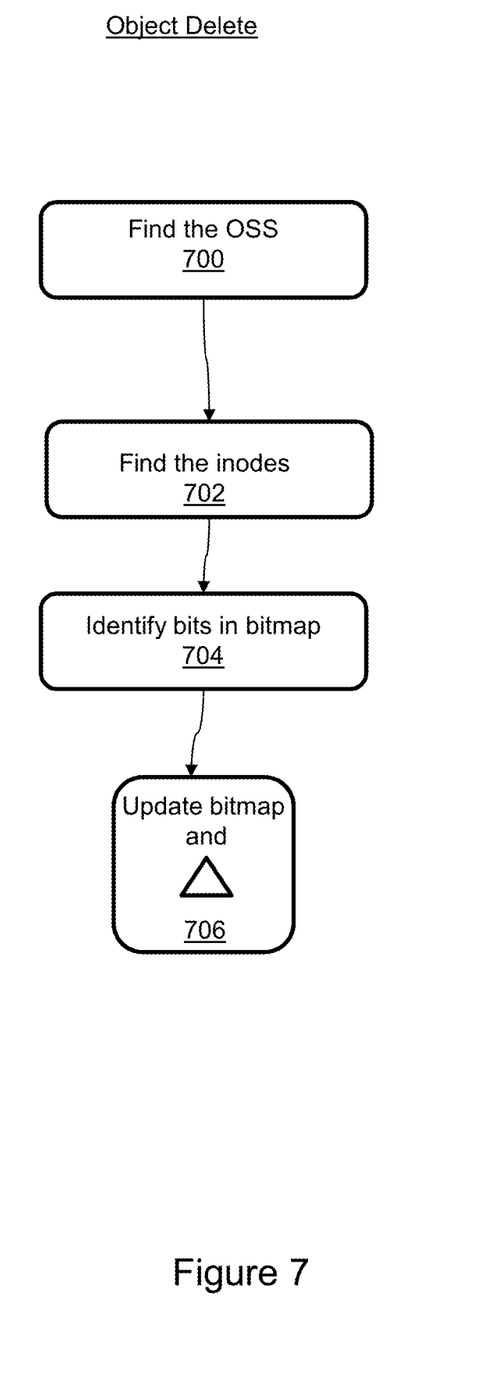
FIG. 7 illustrates and object delete procedure.

FIG. 7 illustrates an object delete procedure. In order to delete an object the director finds the OSS on which the object's inodes are located as indicated in step 700. The director then finds the inodes in that OSS which correspond to the object being deleted as indicated in step 702. The pointers in those inodes are used to identify corresponding bits in the storage level bitmap as indicated in step 704. Those bits are then inverted/cleared and the pyramid data structure is updated as indicated in step 706.

Figure 8:
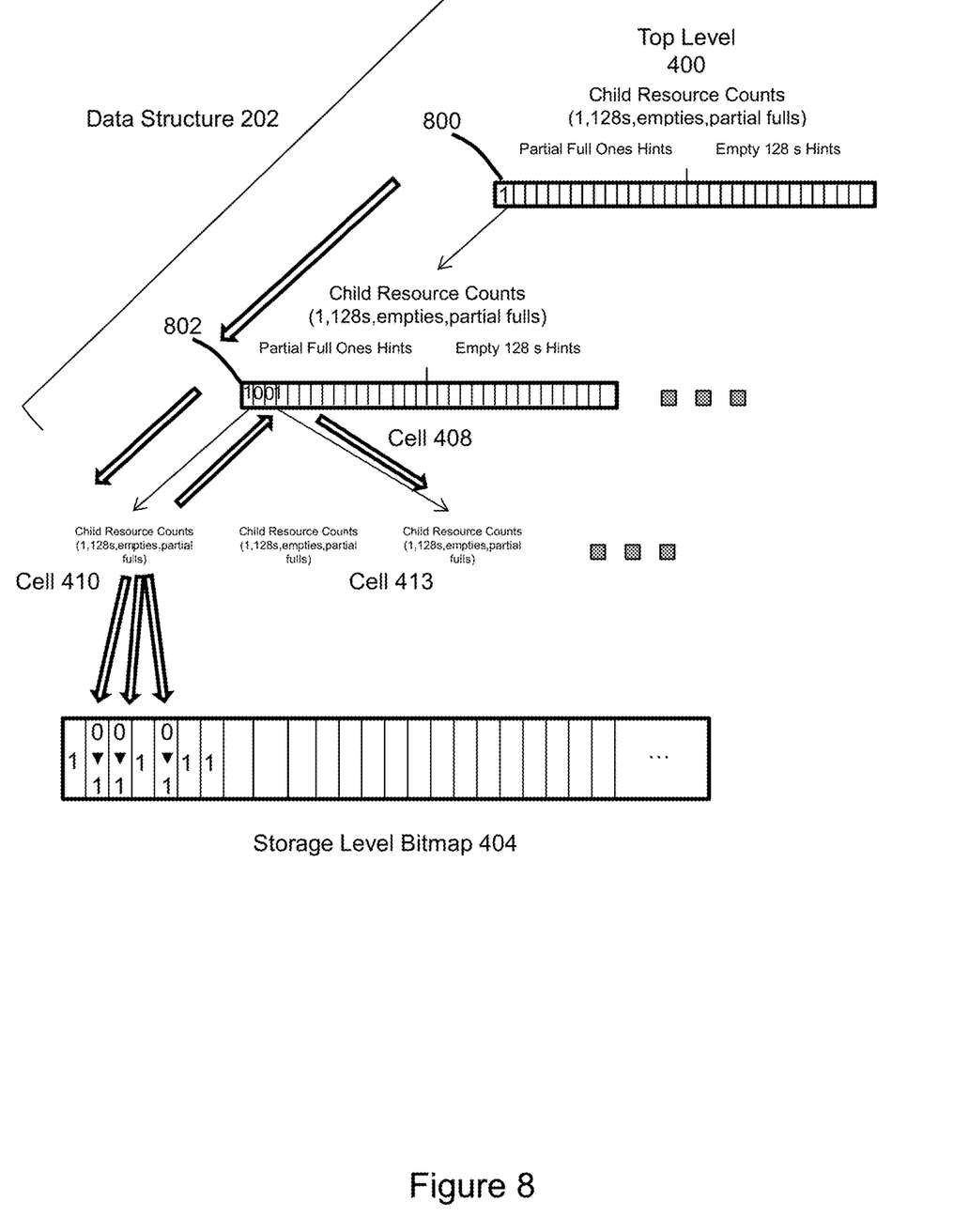
FIG. 8 illustrates use of the pyramid data structure for allocation.

Referring to FIG. 8, the pyramid data structure 124 may be used to allocate pages in flash referenced by inodes. Hints provide guidance for searching through the pyramid data structure to locate cells with the required free is (single pages) and 128s (128 sequential pages). More particularly, partial full is hints are used to find single pages for Start and End inodes, and empty 128s hints are used to find 128s for Compact inodes. In accordance with one technique, starting at the top level 400 in the hints corresponding to the sought resources, e.g., is or 128s, the leftmost positive hint is followed. For example, if 7 1s are sought then the leftmost hint 800 indicating partial full 1s at a lower level cell is followed. The leftmost positive hint 802 at the corresponding child cell 408 is then followed. In the simplified and truncated three level pyramid data structure this leads directly to the bottom level cell 410 from which the resources are allocated by updating the corresponding 128 kb region of the storage level bitmap. In particular, the three available 1's are allocated by updating the bitmap 404, e.g., by inverting the bits corresponding to free spaces. The remaining sought four 1s are obtained by further searching through the pyramid data structure, e.g., by iteratively going up one level (to cell 408) and to the right and then down to the lowest level, at which point resources are allocated. If the resources are not available at a cell then the search proceeds to the right sibling cell. If resources are not available from any sibling cell at a level then the search proceeds up one level and to the right. In other words, families of cells may be sequentially searched. For example, after consuming the free 1s from cell 410 it is determined that cell 412 does not have free 1s and then that cell 413 has free 1s as indicated by searching through the cell 408 hints from left to right. However a wide variety of allocation algorithms could be utilized.

Figure 9:
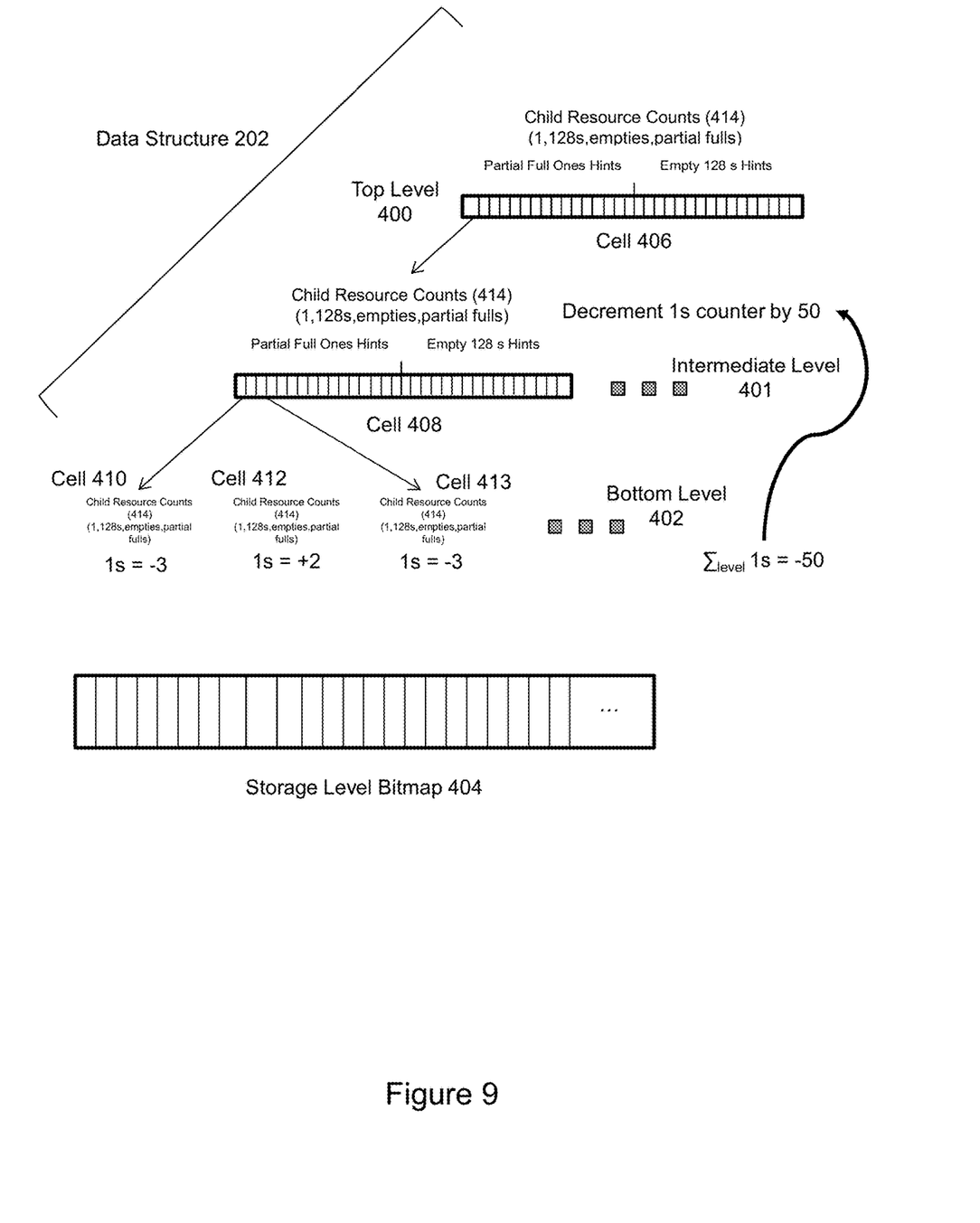
FIG. 9 illustrates counter update.

Referring to FIG. 9, counters 414 in the pyramid data structure 202 may be updated by aggregating sibling deltas. It will be appreciated that in addition to updating the storage level bitmap 404 it is necessary to update the counters 414 as pages are allocated and released. The task of updating the counters is scaled up by the number of cells and levels in the pyramid data structures, in addition to the number of file systems and object activity. In accordance with one aspect the counter deltas for all child cells of the same parent cell are aggregated by summing the deltas of sibling cells at a given level. That sum is used to update the parent cell counter at the next higher level. For example, if a parent cell 408 has 16 children and the free is deltas for all 16 sibling child cells (410, 412, 413 etc.) are summed to −50, the parent cell 408 free is counter is updated based on that sum by decrementing the counter by 50. This tends to be more efficient than separately updating the parent cell for each child cell delta. The procedure is repeated for each different type of counter and at each level.

Some aspects may be associated with certain advantages, although none of the advantages are necessary to the inventive concepts. The separate pyramid data structures for each OSS can help avoid extensive locking by limiting locking scope to relatively small extents. For example, a lock may be limited in scope to one or more 128 bit regions of a storage level bitmap, each corresponding to 128 pages in the Slice. Moreover, the lock may be an allocation type lock so that other operations such as Reads are not locked out. This may help to facilitate contemporaneous addition of devices and resources while allowing other I/Os to be processed. Local resources such as the hash tables and RBT tables that are globally consistent and distributed also facilitate support of multiple concurrent users, even if the tables are loosely coupled and updated asynchronously. Moreover, table parallelism may improve performance via parallel access to the resources needed to find objects. The pyramid data structures tend to improve performance by facilitating efficient analysis and location of resources, and are also fault tolerant because they can be reconstructed from the metadata on the backing storage.

Some aspects, features and embodiments may comprise computer components and computer-implemented steps that will be apparent to those skilled in the art. For example, it should be understood by one of skill in the art that the computer-implemented steps may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a plurality of storage director devices which utilize physical non-volatile storage devices to present a logical storage device to at least one host device, each storage director device having access to a plurality of object storage subsystems in a shared volatile memory which is accessible to all storage director devices, each object storage subsystem describing locations of paged metadata in at least one of the non-volatile storage devices, each object storage subsystem comprising a descriptive data structure that quantifies sequentially addressed free space for paged metadata for that object storage subsystem in the at least one of the non-volatile storage devices, wherein the paged metadata indicates where host data is located in the non-volatile storage devices;
wherein each object storage subsystem comprises a unique object storage subsystem identification number, the respective descriptive data structure associated with that object storage subsystem, and one or more sets of inodes; and
wherein each set of inodes comprises a predictable arrangement of one or more equal size or predictable size nodes including a Start inode disposed at a beginning of any inode set and having pointers to single pages, at least one Compact inode which always references $2^y$ pages with a pointer, where y is greater than 0, and at least one End inode which references single pages with single pointers.

2. The apparatus of claim 1 wherein the shared volatile memory comprises at least one volatile storage device on each director.

3. The apparatus of claim 2 wherein each of the non-volatile storage devices is accessible via one of the storage director devices.

4. The apparatus of claim 1 wherein each object storage subsystem describes locations of the paged metadata in an associated fixed-size slice of at least one of the non-volatile storage devices, and wherein each fixed-size slice comprises contiguous addresses of at least one of the non-volatile storage devices.

5. The apparatus of claim 4 wherein each fixed-size slice is mirrored at least once.

6. The apparatus of claim 1 wherein the descriptive data structure includes a plurality of levels, and wherein a top level includes a single cell which describes free space in a fixed-size slice of at least one of the non-volatile storage devices associated with the respective object storage subsystem.

7. The apparatus of claim 6 wherein the descriptive data structure includes a bottom level with multiple cells, each bottom level cell comprising a bitmap of page availability in a fixed-size sub-portion of the fixed-size slice associated with the respective object storage subsystem.

8. The apparatus of claim 7 wherein the descriptive data structure includes a plurality of intermediate levels with multiple cells, each intermediate level cell describing free space in child cells at a next lower level.

9. The apparatus of claim 8 wherein each intermediate level cell comprises a bitmap of the child cells at the next lower level, the bitmap indicating which of the child cells have page availability at the bottom level with hints to partially full fixed-size sub-portions of the associated fixed-size slice and hints to empty fixed-size sub-portions of the associated fixed-size slice.

10. The apparatus of claim 9 wherein the top level cell and intermediate level cells include a first counter which indicates a count of free single pages and a second counter which indicates a count of free multi-pages, where each multi-page is sequential and has a predetermined size.

11. The apparatus of claim 10 wherein the predetermined size is $2^y$ pages, where y is greater than 0.

12. The apparatus of claim 10 wherein the top level cell and intermediate level cells further include a third counter which indicates a number of partially full fixed-size sub-portions of the associated fixed-size slice, and a fourth counter which indicates a number of empty fixed-size sub-portions of the associated fixed-size slice.

13. The apparatus of claim 1 wherein the object storage subsystem number corresponds to a plurality of mirrors of a fixed-size slice of at least one of the non-volatile storage devices associated with the respective object storage subsystem.

14. The apparatus of claim 1 wherein the inodes of the set are stored in sequential locations in the shared volatile memory.

15. The apparatus of claim 14 wherein the Start inode contains up to $2^x$ pointers to single pages in the non-volatile storage devices, where $2^y$ is a multiple of $2^x$.

16. The apparatus of claim 14 wherein each Compact inode contains at least one pointer to $2^y$ pages in the non-volatile storage devices.

17. The apparatus of claim 16 wherein each End inode contains up to $2^x$ pointers to single pages in the non-volatile storage devices, where $2^y$ is a multiple of $2^x$.

18. The apparatus of claim 1 wherein each director device further comprises a first searchable data structure which indicates locations of metadata in the shared volatile memory.

19. The apparatus of claim 18 wherein each director device further comprises a second searchable data structure which indicates locations of the object storage subsystems in the shared volatile memory.

20. An apparatus comprising:
a plurality of storage director devices which utilize one or more physical non-volatile storage devices to present a logical storage device to at least one host device, each storage director device having access to a plurality of object storage subsystems in a shared volatile memory which is accessible to all storage director devices, each object storage subsystem describing locations of sequentially addressed paged metadata in an associated fixed-size slice of at least one of the non-volatile storage devices, each object storage subsystem being associated with a set of inodes comprising a predictable arrangement of one or more equal size or predictable size nodes including a Start inode disposed at a beginning of any inode set and having pointers to single metadata pages, at least one Compact inode which always references $2^y$ metadata pages with a pointer, where y is greater than 0, and at least one End inode which references single metadata pages with single pointers.

* * * * *